T. HYATT.
Composition Floors, Roofs, Pavements, &c.

No. 206,112.  Patented July 16, 1878.

T. HYATT.
Composition Floors, Roofs, Pavements, &c.
No. 206,112. Patented July 16, 1878.
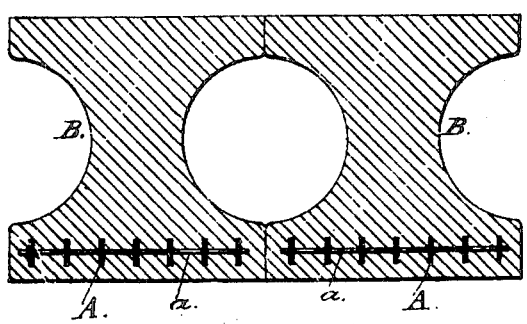
Fig. 6.
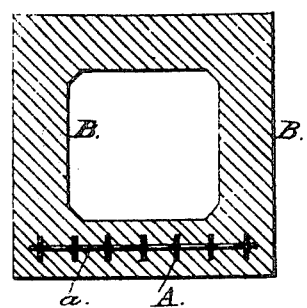
Fig. 8.
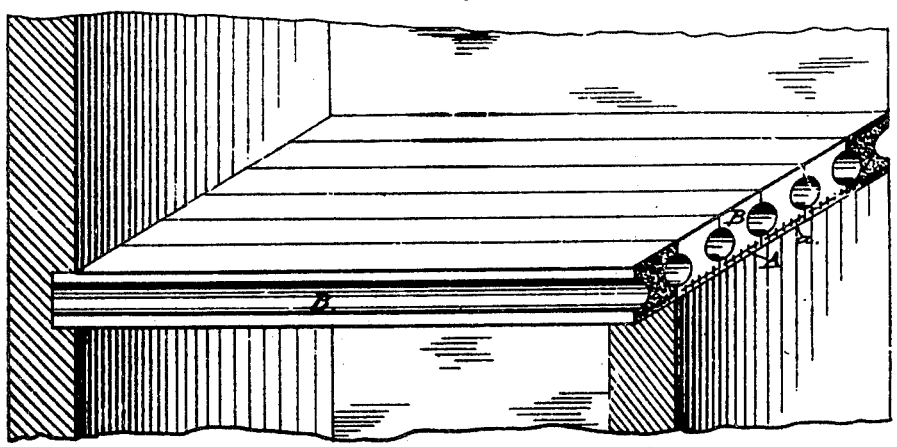
Fig. 7.
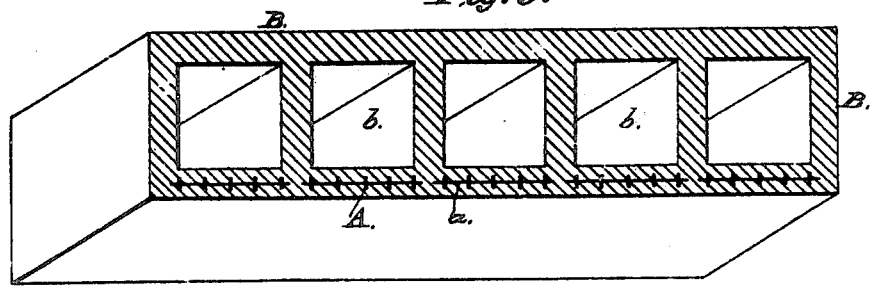
Fig. 9.
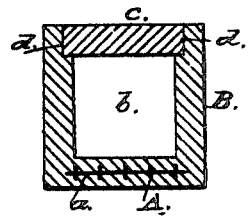
Witnesses:
Inventor:

T. HYATT.
Composition Floors, Roofs, Pavements, &c.
No. 206,112. Patented July 16, 1878.
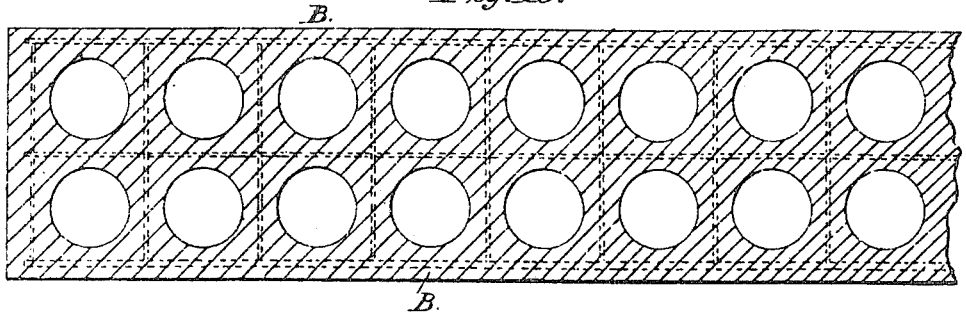
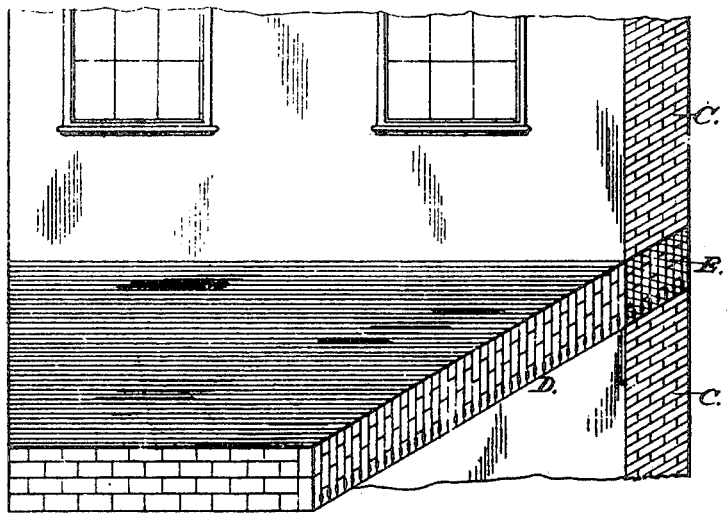
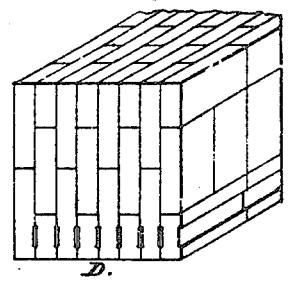
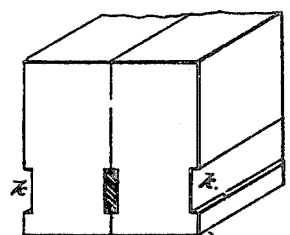
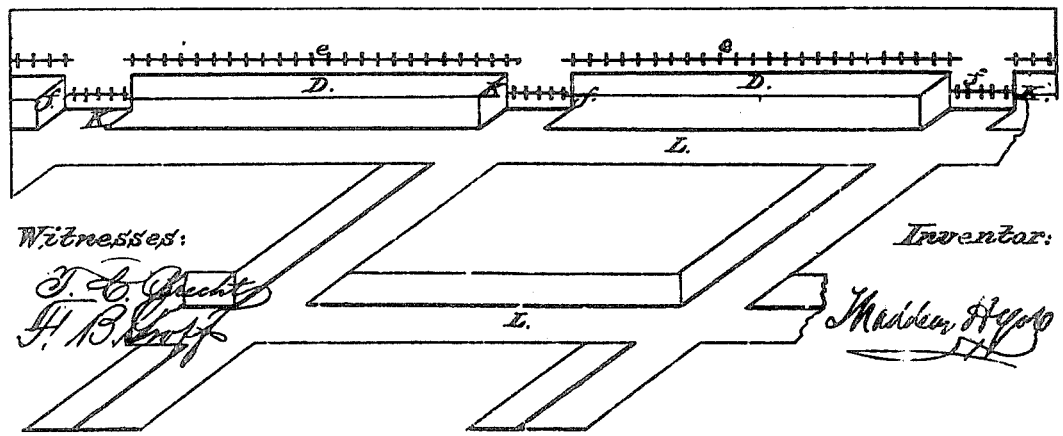
Witnesses:
Inventor:

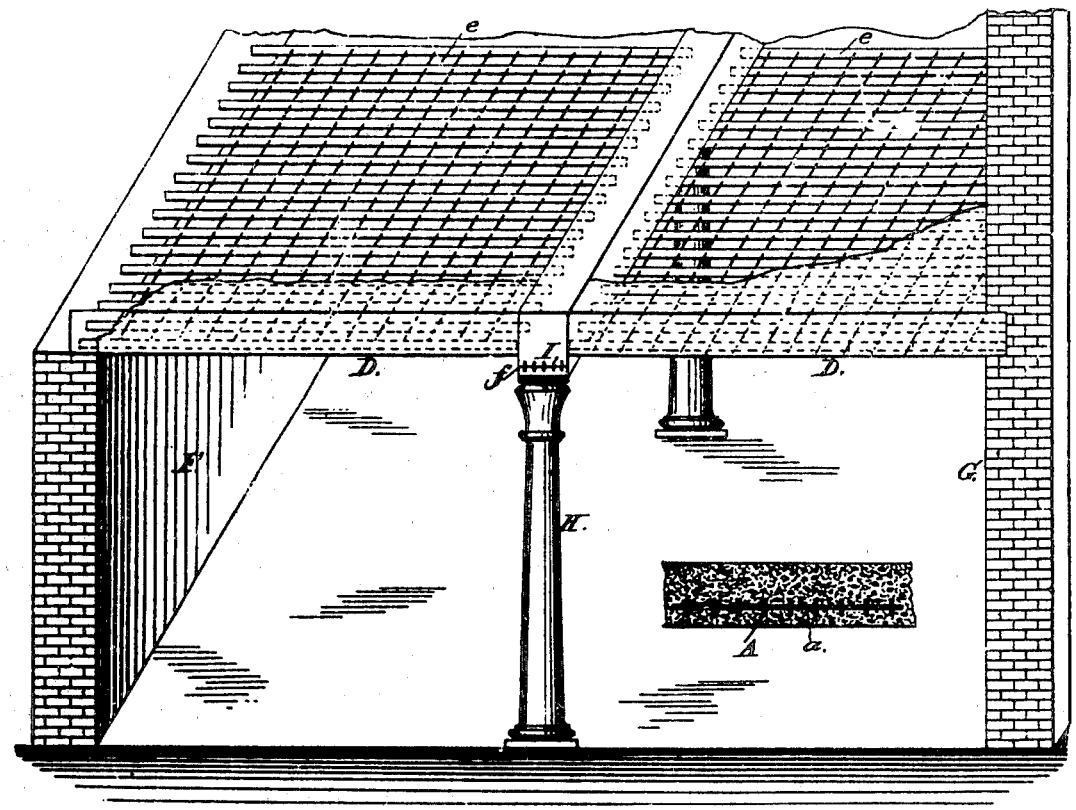
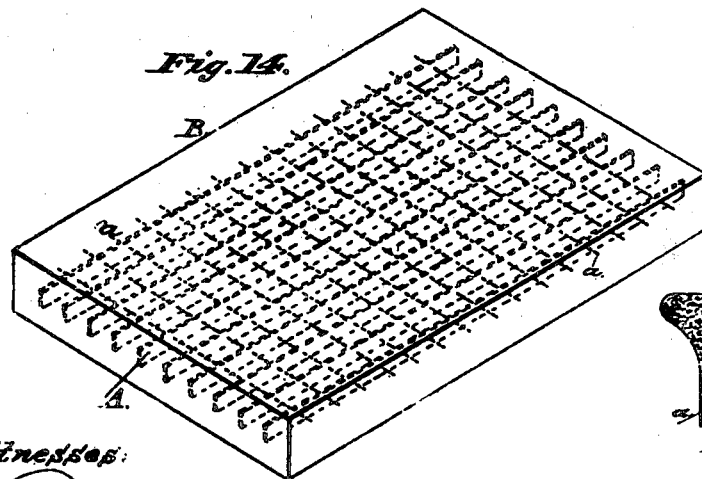
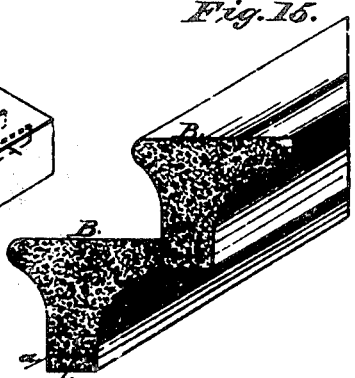

T. HYATT.
Composition Floors, Roofs, Pavements, &c.
No. 206,112. Patented July 16, 1878.
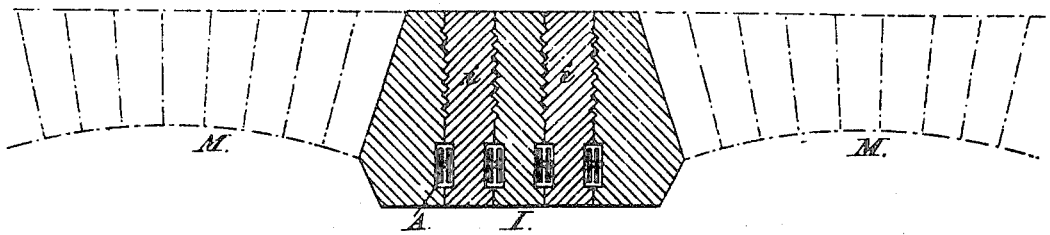
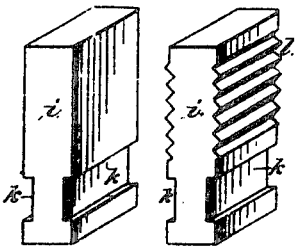
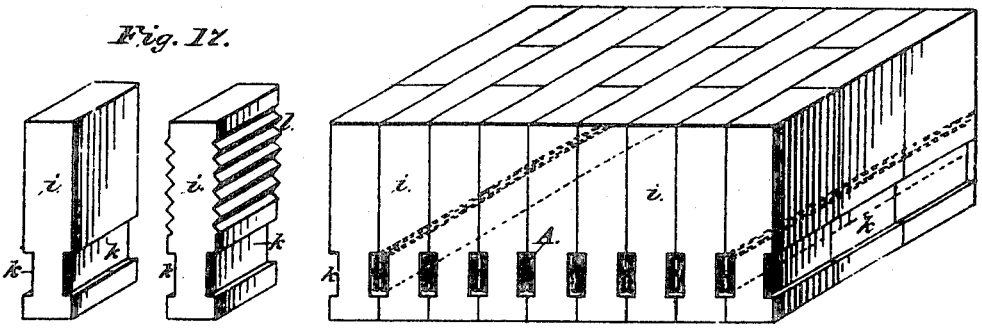
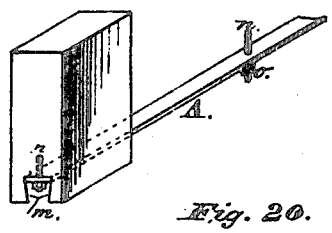
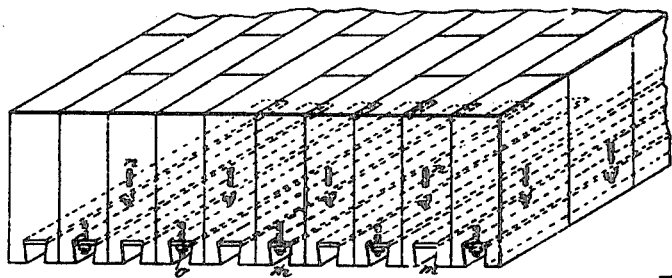

T. HYATT.
Composition Floors, Roofs, Pavements, &c.
No. 206,112. Patented July 16, 1878.
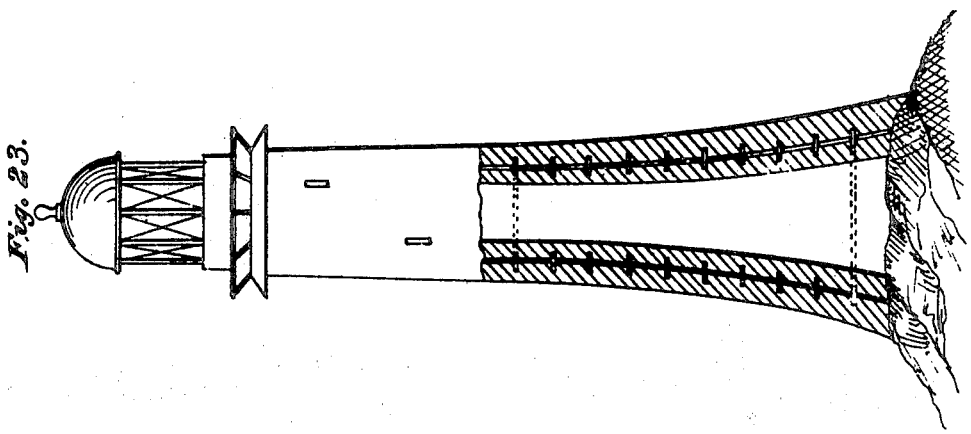
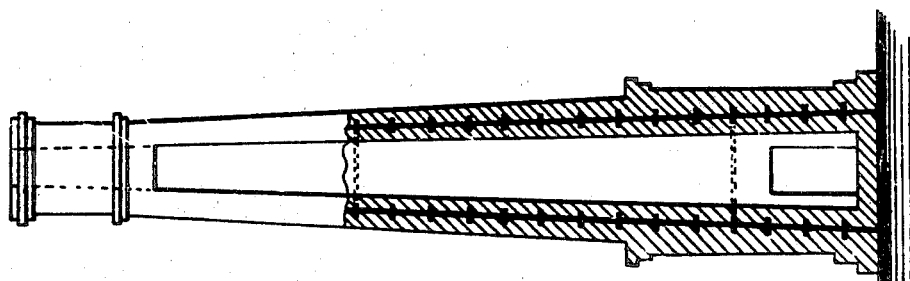
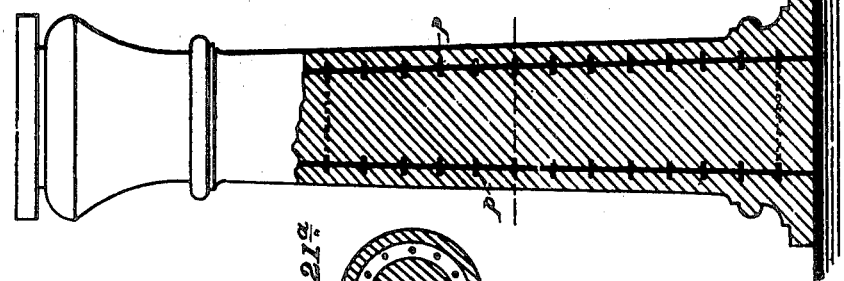
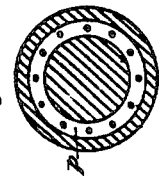
Witnesses:
Inventor:

UNITED STATES PATENT OFFICE.

THADDEUS HYATT, OF NEW YORK, N. Y., ASSIGNOR TO ELIZABETH ADE-
LAIDE LAKE HYATT, TRUSTEE FOR BESSIE L. HYATT, THADDEUS P.
HYATT, CLOTILDE S. HYATT, JAMES H. L. HYATT, AND ANNIE F. HYATT.

IMPROVEMENT IN COMPOSITION FLOORS, ROOFS, PAVEMENTS, &c.

Specification forming part of Letters Patent No. 206,112, dated July 16, 1878; application filed
June 21, 1878.

*To all whom it may concern:*

Be it known that I, THADDEUS HYATT, of No. 25 Waverly Place, in the city of New York, county and State of New York, a citizen of the United States, have invented certain new and useful improvements in the use and application of hydraulic cements and concretes, in combination with metal, as a building material and in building constructions made therefrom, and in means, modes, and processes connected therewith, the same being in part applicable to pavements and other walking and load-bearing surfaces and structures.

The general purport of my invention is set forth in a volume entitled "An Account of Some Experiments with Portland Cement Concrete, Combined with Iron, as a Building Material," &c., a copy of which book has been presented by me to the Patent Office Library.

That iron or steel may be combined with concrete or with bricks as tie-metal, capable of furnishing all the tensile strength needed to balance the compressive resistance of the other materials when the beam or structure is subjected to bending-stress, that all metal may be dispensed with save the tie only, and that both baked bricks and concrete possess in themselves cohesive power and strength sufficient to perform the functions ordinarily performed by a metallic web, are the discoveries made by me through many experiments and years of study, upon which I now base my application for a patent.

In applying my invention to the construction of floors and other walking-surfaces and low-bearing structures, and to roofs, to the making of beams, joists, girders, and supports, and to the making of pavement-slabs not liable to crack from their own weight by the giving way of imperfect foundations underneath them, and to the construction of "roof-pavements," for extending the basements of buildings under the footways of public streets, my improvement consists in the use and application of iron or steel as tie-metal, combined with the concrete or bricks, to give tensile power to the same; my invention, with respect to the tie-metals, consisting in so preparing or making them as to prevent the possibility of any sliding or slipping of the materials one over the other when the beam or structure is under strain.

For resisting "thrust," as, for example, in the "bow-string girder," a tie may be made dependent upon the two end fastenings only; but a beam proper must be qualified to resist cross-strains, and equally well at any part. The tie must of necessity, therefore, be attached to the web practically throughout its entire length, and as firmly at one point as at another, the object of such fastenings not being to prevent the tie from bursting out or breaking away from the web in a downward direction, because no such tendencies exist, but to counteract the tendency of the tie to slide or slip because of the force of the shearing strains got up in the beam when under bending-stress; this discovery of the true relations existing between a tie and its web also demonstrating the sufficiency of the cohesive power of the web itself to hold the tie to the top of the beam, whether such web be concrete or metal, the difference of thickness necessary for this purpose, where the web is concrete instead of being metal, being proportionate to the difference between the cohesive strength or power of metal and concrete. Basing my improvements in the ties and the manner of connecting them with the concrete upon the theory above set forth as to shearing strains, I find it important to make use of ties having the greatest friction-surface. Flat thin ties are, hence, preferable to other shapes. To prevent slipping, these ties require also a roughened surface. This roughened or non-slipping surface may be made in many ways. For some purposes a mere sanded, tarred surface may possibly suffice; but I prefer to use metal specially rolled for the purpose, with bosses or raised portions formed upon the flat faces of the metal. When I make use of common bar or hoop iron, I stud the slips with pins; or I make use of several blades threaded upon wires, as represented by Fig. 1, A being the metal blades, and *a* the wires. These wires require no upsetting at the ends, or heads of any kind, the binding power of the cement being sufficient, there being no tendency to buckle in concrete beams. Tie-metal laid flatwise is theoretically more effective than when employed edgewise; but in practice I find the latter method the best, the arrangement of the blades in gridiron form being most effective and simple.

Fig. 2 represents a flat tie, formed with raised or protuberant parts *a a*. These protuberances may be shaped according to fancy. They may be pins or bosses, as shown; or the surface may be crimped, corrugated, or indented, as shown by Figs. 3 and 4. Non-slipping ties, made substantially as herein described and illustrated, I propose to make and put upon the market as a new manufacture, and as a substitute for metal in beam form.

With respect to the concrete, my invention deals with it either as a plastic material, to be applied to the tie-metals at the place or upon the ground where the construction is required, or as a molded and hardened beam ready for use, and to sustain loads as soon as laid in position, or in the form of tiles or bricks, ready for combination with the ties at the place where the construction is to be made.

In making and applying tiles and bricks, a part of my invention consists, in some cases, in the use and application of soap-stone, or equivalent natural stone capable of withstanding heat and the shock of cold water thrown upon it when heated, in combination with tie-metal, for the purposes herein set forth; also, in the use and application of "mineral wool," or of the "white clay of Hanover," preferably in the form of "floating bricks," or as tiles, such light bricks, or equivalent artificial ones of a light and porous character, being specially adapted for forming the under or ceiling portion of floor-structures; also, in the use and application of specially hard bricks, such as the Staffordshire or blue brick, in combination with tie-metal, to form the upper portion (or that part which resists compression) of floor constructions; also, in the use of fire-bricks and common baked brick, in combination with tie-metal, to form floor, roof, and walking surfaces, as hereinafter and above set forth.

A part of my invention is based on the discovery of the possibility of combining common building-bricks with tie-metal by means of hydraulic cement, in such perfection as to admit of their employment in lieu of more costly materials in the construction of floors, roofs, and walking-surfaces, one of the points in this part of my invention consisting in the use of such bricks placed vertically to the tie-metals, thus producing vertical cement seams or joints, with corresponding vertical friction-surfaces, as contrasted with horizontal ones, the danger to be apprehended from this latter mode of laying the bricks arising from possible imperfect work or weak and poor cement, in which case some of the ceiling-bricks might fall out of place under certain circumstances, to the imminent peril of any heads below them.

Another part of my invention in this connection has reference to the necessity of providing for the construction of floors of different thicknesses. To meet this necessity, make a series of standard sizes of floor and roof bricks from four to twelve inches long and from four to six inches wide, and preferably not over two inches thick, with fraction bricks of each size, for the purpose of breaking joints vertically, by this means providing for perfect construction of floors and roofs of any thickness, and with the utmost convenience and cheapness.

Another part of my invention consists in making roofs and walking-surfaces of equal bearing-strength in every part, by means of tie-metals or tensile strength distributed equally throughout the construction, thus making the structure beam all over. By this mode of construction I employ the metal in distributed form, instead of employing it in concentrated or beam form. The putting of metal in the form of beams is such a concentration of power or strength upon or within a single line as to make necessary very considerable spaces between the beams, the result of this being to load the beams with the weight of the materials used to fill the spaces. Nevertheless, the employment of the metal in tie form is no obstacle to the construction of roofs and floors on the beam principle of concentrated metal, a part of my invention consisting in the making of segmental-arch floors by the use of brick beams combined with the arches. Where bricks are employed in combination with concentrated ties to form brick beams, as for example in the segmental-arch construction, a part of my invention consists in forming them with recesses or pockets to receive the ties, and with serrated, corrugated, or roughened surfaces to interlock with one another and give this additional security to the beam-structure during the period required for the hardening of the cement in the joints.

In illustration of the foregoing, I refer to the following figures, where Fig. 5 represents a construction of concrete—B the concrete, and A the tie-metals, *a* being the wires. This figure may be taken to represent either a roof, a floor, or other walking-surface, such as a foot-pavement, concrete slabs of this kind being cheaper and better than granite for making roof-pavements over basement-extensions, it being possible to construct them sufficiently large to form an entire sidewalk, having the side walls of the extension for their foundation, no iron beams of any kind being required. Fig. 5 may also be taken to represent pavement-slabs of any size to be employed in place of common flag-stones, the tensile strength derived from the metal ties preventing cracking even when the foundations are imperfect.

Fig. 6 represents a molded concrete web and flange beam, and Fig. 7 a floor made of them, the web and flanges of the beams being joined by curved lines to give additional strength, thus forming longitudinal flues or ventilating-spaces in the floors, besides making the construction of less weight.

Fig. 8 represents a molded beam in box-girder form.

Fig. 9 represents a cellular beam or honey-comb construction, the cells being vertical. These beams, after being molded and dried, have the cells *b* closed by the lids *c*, which are molded and hardened slabs of concrete, made to fit the cells and rest in the rabbets *d*, formed to receive them, where they are then cemented and become a portion of the top flange of the beam.

Figure 1:
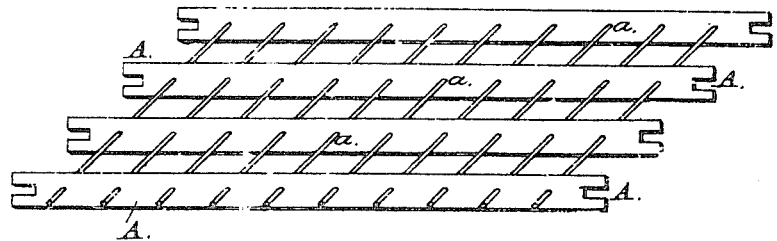
Figure 2:
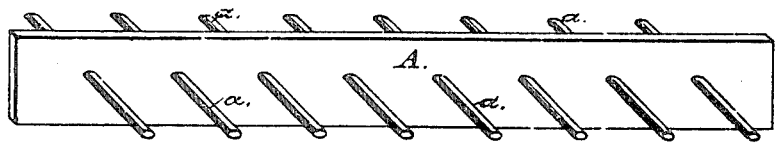
Figure 3:
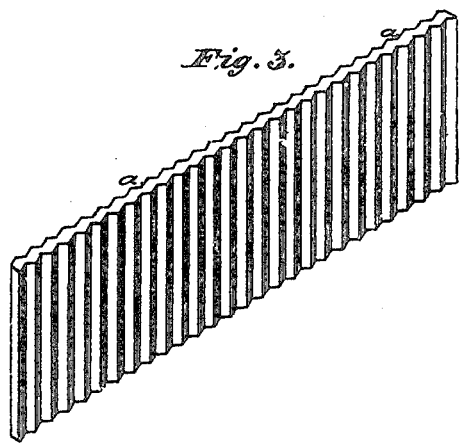
Figure 4:
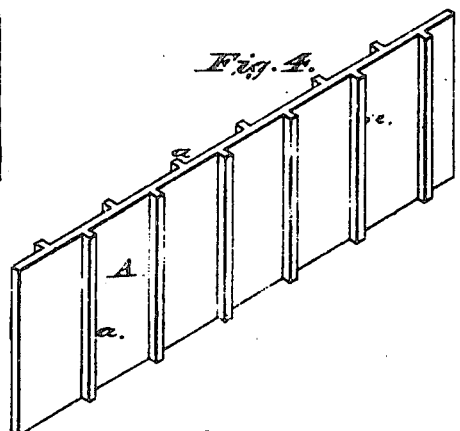

The constructions thus far illustrated and described refer to buildings of ordinary size; but where the spans are great, as in mills and warehouses, the manner of constructing the beams admits of considerable variation, for they are needed, in part, under these circumstances to be fashioned as girders or short bridges, in order to carry a portion of the flooring in place of a wall. As commonly made of naked metal, such structures are liable to be injured by rust, and the bolts in some cases to be loosened by vibration.

My improvement in structures of this kind consists in protecting the metal by a complete incasement of hydraulic cement or concrete, the effect of which is to both protect the metal from rust and add additional security to every bolt in the structure, the grouting of the hydraulic-cement concrete filling every interstice of the metal portions, and thus producing a perfect union and solidity down to the smallest rivet or pin, making it impossible for any of the parts to work loose. This incasement may bear such relation to the metallic parts as to be a mere shield for the purposes mentioned; or the concrete may be so proportioned to the metal as to become a portion of the mechanical construction of the structure, whether girder or bridge, with reference to compressive strains. Fig. 10 represents such a structure, the dotted lines representing the metals and the shaded portions the concrete.

In ordinary house-construction it is a common practice to carry the front and rear walls upon girders, the cost of these girders adding materially to the expense of such walls; whereas, by adopting my method of construction, the portion of floor in contact with and underneath the wall may be regarded as a part of it, the metal ties in such portions of the floor serving as tie-metals to the wall itself, converting thus the wall itself into a girder.

Fig. 11 represents this construction, C being a rear wall and D the floor, E showing where the floor and wall unite. This is represented as made of bricks. Figs. 11$^a$ and 11$^b$ are enlarged detail views of the floor.

Viewing E as the lower portion of the wall, and not a part of the floor, it is evident that the same principle of tie-metal construction applies equally to the head-pieces of all wall-openings, and may be employed with advantage in them all.

Again, it is the practice in common warehouse-building to break the span by a row of columns topped by a girder, to carry the floor in conjunction with the side walls, the whole depth of such girder being seen underneath the floor, and to this extent at that line lessening the head-room of the apartment underneath; but by my method of construction the girder and floor become one, the girder not being underneath the floor, but a portion of it, and thus, to a large extent, lost to view in it. The consequence of this of course is to give increased head-room to the apartment below, besides improving the appearance of the overhead construction.

Fig. 12 represents this method of construction. F G are the side walls; H, the columns; D, the floor; and I the portion of the girder seen below the floor, being only a fraction of its entire depth, the top of the floor at that part being the actual top of the girder. It will be noted that in this method of construction there are two distinct sets of ties, *e*, which are the floor-ties, and *f*, which are the girder-ties, running at right angles to those in the floor.

Fig. 13 represents a novel method of applying the principles of my new construction, being a floor similar to the last above, but composed of a series of parallel girders, K, laid with instead of crosswise to the floor D, and merged into the floor-structure, so as to become an integral portion of it. The floor-ties *e*, it will be seen, lie parallel with the girder-ties *f*, the strength of the girders being given to the floor-sections D by means of the short cross-ties L, which run through the sections and into the girders. By this method the girders, instead of being loaded with the whole weight of the floors between them, are required to carry no portion of them as dead weight, and only carry, under any and all circumstances, a portion of whatever load is put upon them.

In the practical construction of concrete and brick beams with tie-metals, as described, I have discovered by my experiments that these beams may be so made as to either break short, like a cast-iron beam, or give way by first bending, like a wrought-iron beam, the difference resulting from the proportion of tensile strength put into the beam—that is to say, where enough metal is used to make the beam strongest at the bottom.

By this mode of construction all danger of sudden collapse of the structure is avoided, such a floor, like one of timber, giving warning in advance of the final catastrophe. A part of my invention consists, therefore, in making the aforesaid floor, roof, and walking-surface constructions of concrete, or bricks and tie-metals, so proportioned, the one to the other, as to produce relatively the greatest strength at the bottom of the construction, the ties being stronger than the portion of the structure which resists compression.

Figure 5:
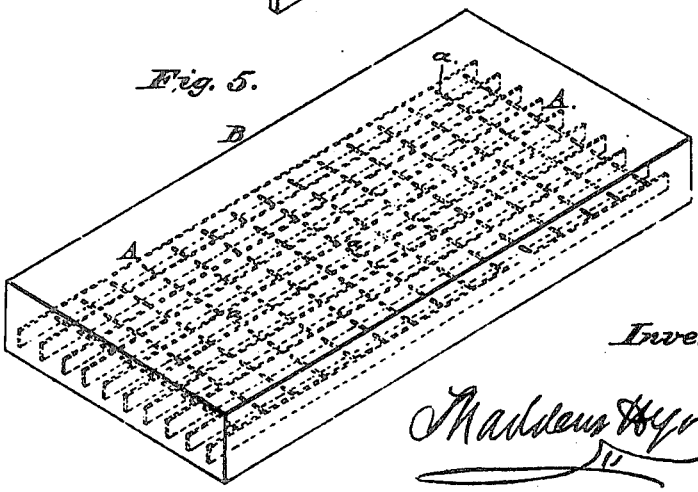

Fig. 14 represents a tie-metal slab similar to Fig. 5, except that the tie-metals are placed at the center instead of at or near one of the faces of the slab, this form being designed for use as a partition where strength is needed equally at both sides of the ties. Slabs of this kind, called "partition-slabs," may be set up and fastened in place by any convenient method, such, for example, as by making a furrow in the floor to receive the foot of the slab, and a corresponding one in the ceiling above to receive the upper end, both being then cemented in place.

Fig. 15 represents a web and flange beam stairway, B being the concrete step, and A the tie-metals in the step.

In the employment of Portland-cement concretes for fire-proof constructions, a part of my invention consists in mixing sulphur, or pyrites, or other compound containing sulphur, with the cement, to make it capable of resisting cold water when thrown upon the concrete in a red-hot or heated state, ten or twelve per cent. of sulphur or its compounds added to the cement being sufficient for the purpose.

In the employment of common bricks, combined with tie-metals, in the construction of floors, roofs, and walking-surfaces, a part of my invention, as has been stated, consists in applying such bricks in vertical position, as represented by the floor, Figs. 11, 11$^a$, and 11$^b$.

Fig. 16 represents a segmental-arch-floor construction, the arches M being of common brick, the beams I being made of bricks $i$ and tie-metals A.

Fig. 17 represents an improved brick for making such constructions, $k$ being the recesses or pockets for receiving and holding the ties, and $l$ being the cross-teeth or corrugations, to produce the interlock between the bricks when put together by interlocking one with the other, or by means of the interposed cement, when hardened. Where the plan of arch-floors is adopted, I make skewbacks, as shown in Fig. 16, to match the other bricks.

Fig. 18 represents a flat floor made of bricks, such as are represented by Fig. 17.

Fig. 19 represents a brick, and Fig. 20 a floor made of such bricks, in which each brick is formed with a channel, $m$, in the bottom of the brick to receive the tie after the floor has been made, each brick, or as many as may be desired, being made with a metal-threaded pin, $n$, or provided with the same after the brick has been made, a suitable hole for this purpose being left in the brick to insert and cement the pin in its place. After the floor has been made, the tie A, formed with holes to match the pins in the bricks, is fixed within the channel $m$, as shown, the ends of the pins coming through the holes in the tie, and then secured by the nuts $o$, after which the channel is filled up with fire-proof cement.

Figs. 21, 22, and 23 represent my improved method of making columns, chimneys, light-houses, and similar structures, the tie-metals being either circular, as shown at 21$^a$, or straight and vertical, according to the purpose of the construction. For columns I apply them in the form of curved or circular ties. Where a cast-iron, stone, or wood column is made use of, I employ the metals and concrete as a jacket; but, in constructing the columns or piers wholly of concrete, I make the structure solid, the concrete then bearing the load, and, giving way under compression, would naturally incline to yield in the first place, not from absolute crush of the materials, but from want of sufficient tensile resistance at the circumference of the column. But this tendency being resisted by the circular ties $p$, such a concrete column could give way only by the crush of its particles.

As the need of a column is for immediate use, a part of my invention consists in molding and hardening the same in shapes and sizes needed for use with fluted, finished, and ornamented exteriors, as a new manufacture.

Having thus fully described my invention and shown the various modes of applying the same, what I claim, and desire to secure by Letters Patent, is—

The manufacture, use, and application of the aforesaid materials, and the modes, means, and processes connected therewith, when the same are employed for the purposes and in the manner substantially as hereinbefore set forth, and illustrated by my drawings.

THADDEUS HYATT.

Witnesses:
A. MOORE,
H. E. BATES.